United States Patent [19]

Hale

[11] Patent Number: 4,784,676
[45] Date of Patent: Nov. 15, 1988

[54] DISPOSABLE VACUUM CLEANER BAG

[76] Inventor: Dorothy G. Hale, Rt. 2, Box 231-B, Bridgeport, Tex. 76026

[21] Appl. No.: 119,664

[22] Filed: Nov. 12, 1987

[51] Int. Cl.$^4$ .............................................. B01D 47/02
[52] U.S. Cl. ......................................... 55/255; 55/256; 55/364; 55/381; 55/259; 15/351; 15/353
[58] Field of Search ..................... 55/259, 257 NP, 97, 55/95, 381, 255, 256, 361, 473, 446, DIG. 3; 15/351, 353; 604/319, 332, 333

[56] References Cited

U.S. PATENT DOCUMENTS

| | | | |
|---|---|---|---|
| 890,514 | 6/1908 | Johnson | 55/DIG. 3 |
| 1,077,358 | 11/1913 | McDevitt | 55/429 |
| 1,504,136 | 8/1924 | Patterson et al. | 55/364 |
| 1,561,928 | 11/1925 | Jaquith | 55/364 |
| 1,802,228 | 4/1931 | Witte | 55/319 |
| 1,828,584 | 10/1931 | Anderson | 55/364 |
| 2,247,103 | 6/1941 | Summerson | 55/255 |
| 2,539,867 | 1/1951 | Schnabel | 55/255 |
| 3,815,333 | 6/1974 | Rhodes | 55/374 |
| 4,119,414 | 10/1978 | Smaling | 55/97 |
| 4,275,373 | 6/1981 | Gereg | 604/320 |
| 4,678,485 | 7/1987 | Finley et al. | 55/255 |

FOREIGN PATENT DOCUMENTS 2139501 11/1984 United Kingdom ................ 604/332

*Primary Examiner*—Bernard Nozick
*Attorney, Agent, or Firm*—Daniel Rubin

[57] ABSTRACT

A disposable bag for removal of dust vacuum cleaners comprised of a nonporous polymer composition sheeting sealed water tight for internally containing a quantity of water that functions as the dust removal media. The bag is configured for mounting internally within the external fabric bag customarily provided by the vacuum cleaner manufacturer. Discharge of dust laden air from the vacuum blower is connected to an air inlet on the bag from which an internal guide directs the air flow to within the body of water. Emerging from the water substantially dust free, the air is directed past baffles to eliminate entrained moisture before being discharged through an outlet opening to the surrounding environment.

8 Claims, 1 Drawing Sheet

DISPOSABLE VACUUM CLEANER BAG

TECHNICAL FIELD

The technical field to which the invention relates pertains to the art of filter bags of a disposable type normally used in vacuum cleaners for domestic, commercial or industrial surface cleaning.

BACKGROUND OF THE INVENTION

By and large the majority of vacuum cleaner apparatus in current use for surface sweeping of floors, furniture and the like utilize a porous paper bag which can be readily disposed of when filled to capacity with dust and other debris. The function of the bag is to trap most of the vacuumed dust or dirt particles while returning the relatively clean air flow outward through the bag to the surrounding environment. While reconciled as adequate for most purposes, it is evident that the porous paper bag has a relatively low dust retention efficiency and is in fact deficient in the quality of cleaning actually provided.

The porosity quality of the bag is a key factor in determining the ability of the bag to trap dust particles such that selection of bag material at most represents a compromise in performance. That is, materials of high porosity tend to afford a minimum of dust retention permitting much of the more finer sifting dust particles to be recycled with the air flow through the bag and back to the environment. On the other hand, a low porosity material tends to afford a high rage of dust retention but adversely produces too great a pressure drop across the bag resulting in a reduced air flow and effectiveness of the vacuum. Even a new bag will, in a matter of minutes, begin to incur pore clogging that in turn impedes the air flow.

As an economy of operation, present vacuum cleaner bags are designed for use until about half or three fourths filled before a changeout is expected to be conducted by the operator. Many times, the need for changeout is overlooked or ignored. Moreover, it is customary to store the vacuum cleaner with partially filled bags still attached, thereby providing an opportunity for previously collected mold and germs to breed and be blown out with subsequent uses of the vacuum cleaner. The foregoing has to some extent been realized in connection with other vacuum retention systems known and disclosed for example in U.S. Pat. Nos. 890,514; 1,504,136; 1,561,928; and 2,539,687.

BRIEF SUMMARY OF THE INVENTION

This invention relates to disposable dust collection bags for use in vacuum cleaner apparatus. More specifically, the invention relates to a novel construction for disposable vacuum cleaner bags that overcomes many if not all of the noted deficiencies of the porous paper bags currently in use for that purpose.

Unlike the porous paper bag which operates on the principle of mechanical trapping of dust particles, the bag of the invention provides a water trap through which all vacuumed air from the cleaner apparatus must pass. The bag is comprised of a water proof non-porous composition completely sealed except for spaced apart openings through which dust laden air is received from the cleaner to pass through the water trap and subsequently be discharged to atmosphere substantially dust free. Baffles spaced apart and located intermediate the openings above the water trap provide a torturous and controlled flow path for the air flow emerging from the water trap enabling any entrained water droplets to be separated before the clean air is discharged.

Being that the dust collection media is a liquid rather than porous paper, cleaning efficiency is substantially enhanced as compared to the paper bag by trapping not only the larger particles but even the fine micron sized dust particles that have previously escaped to atmosphere. By forming bags of select configurations and sizes the bags can with moderate modifications be readily adapted either as original equipment or as a replacement for paper bags current being utilized It is therefore an important aspect of the invention to provide a novel bag construction for dust removal use in vacuum cleaners.

It is a further important aspect of the invention to provide the latter aspect as a disposable commodity yet affording substantially enhanced cleaning efficiency compared to the cleaning efficiencies heretofore available.

The above noted features and advantages of the invention as well as other superior aspects thereof will be further appreciated by those skilled in the art upon reading the detailed description which follows in conjunction with the drawings.

DESCRIPTION OF THE PREFERRED EMBODIMENT

Figure 1:
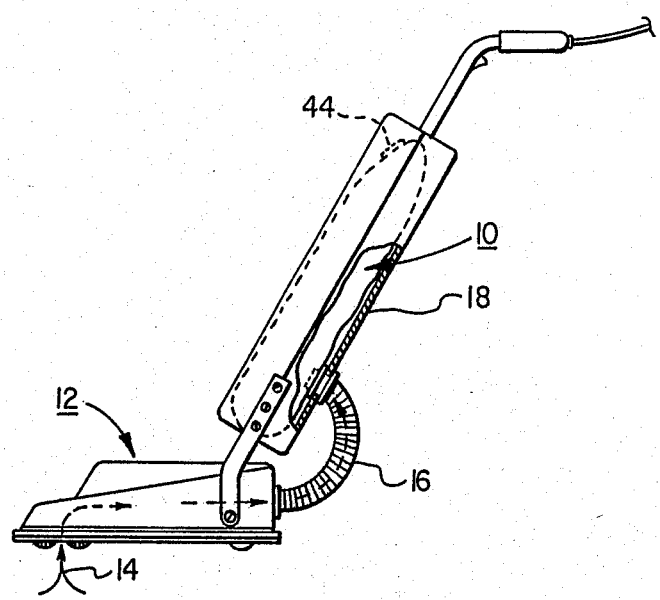
FIG. 1 is a side elevation of an upright vacuum cleaner utilizing the disposable collection bag of the invention.
Figure 2:
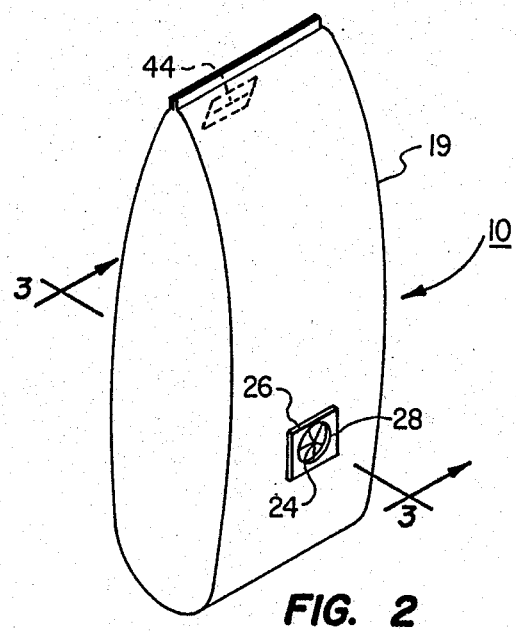
FIG. 2 is an enlarged isometric view of the disposable collection bag of the invention.

In the description that follows, like parts are marked throughout the specification and drawings with the same reference numerals respectively. The drawing figures are not necessary to scale and in certain views parts may be drawn rotated into the plane of the drawing for purposes of clarity.

Referring now to the drawings, there is disclosed in FIG. 1 an upright type vacuum cleaner 12 of a conventional type in which suction air 14 is induced to flow through conduit 16 and exterior fabric bag 18 into the disposable collection bag hereof designated 10. Bag 10, as will be described, is sized to be comfortably received within the bag 18 in an upright orientation as shown and can of course be dimensionally varied to suit depending on the specific application for which it is intended.

Referring more specifically to FIGS. 2-5, the bag 10 hereof is of a generally elongated configuration formed of a water proof non-porous sheeting 19 such as polymer plastic composition of either polyethylene vinyl or polyvinyl chloride. For either material the sheeting is sealed along seams not shown in order to effect a water tight compartment 20 throughout. Suitable for the purposes hereof are sheeting thicknesses of about fifteen mils such that when completely formed the bag is characterized by sufficient strength against inadvertent tearing or rupture when handled or when in service. A finished size for the embodiment being described of approximately 16 inches long by 8½ inches wide is preferred. The bag has been folded in half lengthwise to form the configuration shown in FIG. 3. A lower inverted pleat initially formed on the underside of bag 10 has been expanded outward by the contained liquid dust removal media 22 which for the preferred embodiment comprises water.

For receiving vacuumed dust laden air flow 14 through conduit 16, there is provided an inlet 24 on the backside of bag 10 in the form of a rectangular shaped collar 26 of a rigid plastic material located above the level of liquid 22. A central aperture 28 is defined thereat for receipt of the discharge end 30 of conduit 16. Secured interior of the bag surrounding inlet 24 is an air intake tube 32 in communication with conduit 16 and constructed of a durable, relatively rigid polyethylene composition about 6½ inches wide by 9 inches long. The tube 32 extends from a location at the inlet above the surface level of liquid 22 for a substantial distance downward to its distal end 36 immersed in liquid 22 at a location approaching the interior bag bottom 34.

Tube 32 has an interior diameter of approximately 3 inches and includes a lower angular offset or cutout at its distal end 36. This enables the air flow 14 containing entrained dust particles to be directionally discharged from outlet 36 with a lateral component of flow within liquid 22 before turning upward for emerging therefrom. Air flow 38 emerging from liquid 22 is substantially if not completely dust free by virtue of the dust trapping afforded by liquid media 22. Following emergence, the air flow will directionally flow as generally indicated by the arrows for sequentially impinging against spaced apart baffles 40 and 42. The baffles define a controlled and somewhat tortuous flow path of air flow 38 toward outlet 44 from which the discharging air flow can pass through fabric bag 18 into the surrounding atmosphere in a conventional manner.

Each of the baffles 40 and 42 are of a generally rectangular configuration (FIGS. 4 and 5) having corresponding edges 54, 56, 58 and 60 in which are formed a plurality of angular cutouts 46. Both baffles are formed of a composition similar to that described supra and likewise are of approximately 15 mil thickness. Each baffle is individually sized for fitting within the bag 10 at their respective locations in an angular offset of about 45 degrees with respect to the otherwise upright orientation of the bag. Mounting and securing each baffle to the interior of the bag at their selected location includes attaching two sides while the other sides are permitted to remain free and unsecured. In the preferred arrangement, sides 54 and 58 extend contiguously but unattached to the inside face of bag sheeting 19 while sides 56 and 60 are secured thereat as by adhesive in a well manner known. With the baffles in place they form a plurality of series arranged sectional compartments immediately superposed over the dust removal compartment 64 in which liquid 22 is contained.

For defining the flow path of emerging air flow 38 there is formed as described within each of the baffles a plurality of angular cutouts 46 adjacent to the surface of sheeting 19 and at varied and staggered locations in baffle 40 relative to baffle 42. In this manner the air flow is provided a concomitant tortuous flow path past the baffles through the cutouts and open sides 54 and 58 leading to outlet 44. Forming outlet 44 is a collar 48 secured thereto for defining a central opening of about 2 inches by 4 inches that includes an overlay 66 of polyethylene foam.

Figure 3:
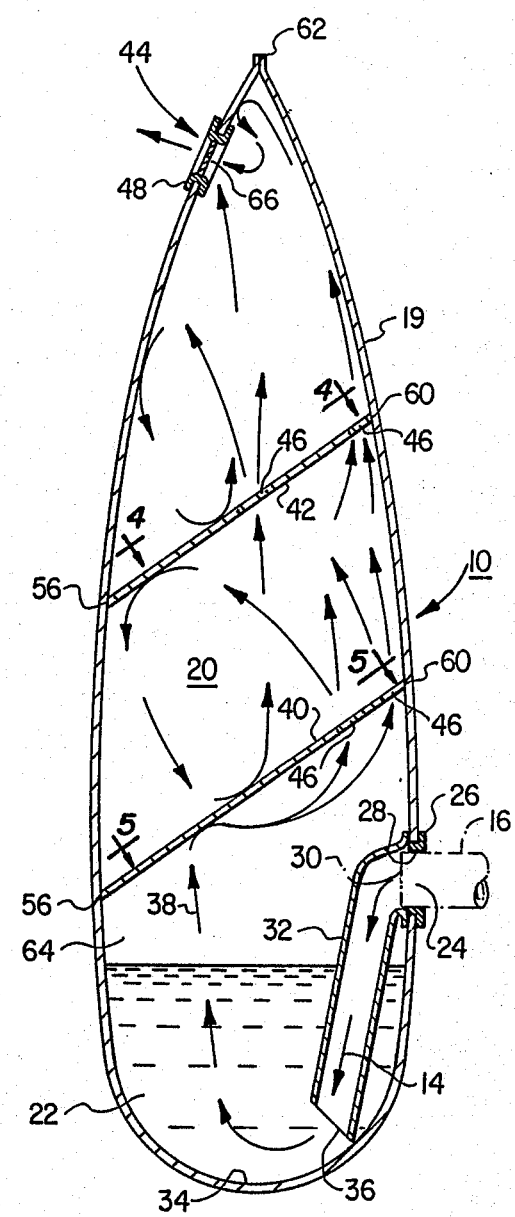
FIG. 3 is a further enlarged sectional elevation as seen substantially from the position 3—3 of FIG. 2.
Figure 4:
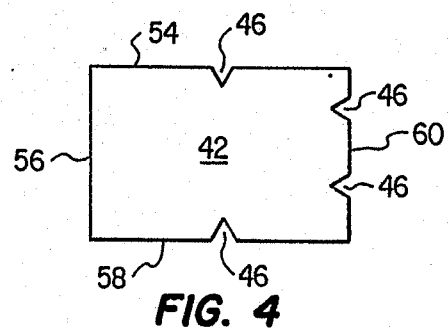
FIG. 4 is a plan view of one baffle as seen substantially from the position 4—4 of FIG. 3.
Figure 5:
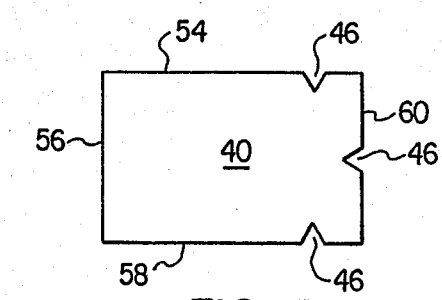
FIG. 5 is a plan view of another baffle as seen substantially from the position 5—5 of FIG. 3.

With the foregoing components secured in place, as described supra, the fabrication of bag 10 is completed by sealing along its exposed edges by adhesive, heat seal, electronic welding, etc. as are well known in the art and forming at least a doubled-over seam 62 along the top edge thereof for convenience of handling. The seals and sheeting 19 are intended to withstand an operaitng pressure on the order of approximately 15 psi. The quantity of provided liquid 22 is on the order of about one cup for effecting a trough-like section in FIG. 3 representing about twelve percent of the volume of the entire compartment 20. In the preferred embodiment, liquid 22 comprises water that may be scented and/or otherwise treated if desired for fragrance and stagnation avoidance during storage. Optionally, the bag can be marketed dry and a cup of water added on site prior to or after placement of the bag in vacuum cleaner 12. For shelf storage purposes of the bag when prepackaged with the water, the bag is folded in a manner to avoid spillage and normally placed in an upright position within a plastic envelope or other suitable container for ultimate distribution. It is contemplated that bag 10 hereof may be replaced on a daily basis during normal vaccum cleaner use or may be retained for several days when used for relatively short intermittent periods. It is not anticipated that the bags will remain in the vacuum cleaner for long durations until filled with debris as is customary with the porous paper bags currently utilized.

In operation, dust laden vacuum air 14 being conducted by conduit 16 is introduced into bag 10 at inlet 24. From the inlet, intake tube 32 conducts the flow downward to an outlet 36 immersed in liquid 22 and by which even the finest of dust particles are caused to be trapped and separated from the air flow. The air flow 38 emerging from the liquid trough will first impinge along the underface of baffle 40 before forcing its way concomitantly past the edges 54 and 58 and through the triangular cutouts 46 thereof. This causes moisture of significance such as droplets entrained in the emerging air flow to be generally separated therefrom and returned to the water trough. After flowing past baffle 40, a further similar sequential baffling effect is achieved by baffle 42 before directing the air flow toward outlet 44 from which the exiting air is substantially if not completely dust free without any significant quantities of entrained water.

By the above description there has been disclosed a novel vacuum cleaner bag that is characteristically disposable yet affords substantially increased cleaning efficiency than heretofore available. By virtue of the liquid dust removal media, there is removed not only the conventionally retained dust particles that have been typically retained in the past but in addition, the bag hereof also enjoys a high retention rate of the extremely fine sifting type dust that has previously been unretained by escaping through the porous paper bags presently in use. The virtues of the bag hereof are of course many in effecting not only greater retention of the dust quantities removed from vacuumed surfaces but by eliminating the recycling aspect of the fine dust associated with the disposable bag filters of the prior art. The result is a more dust free environment while likewise reducing the potential for adverse health effects which such dust particles are known to contribute toward.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A disposable dust collection bag for use internally of the dust collection compartment of a vacuum cleaner apparatus and comprising in combination:
   an elongated collection bag of nonporous composition defining an internal compartment having a portion in which to contain a body of liquid comprising the dust collection media, said bag being of a size and shape adapted to be received internally of the vacuum cleaner dust collection compartment with which the collection bag is to be utilized;
   inlet means defined in said collection bag at a location above the normal liquid level and adapted to receive dust laden air from the vacuum cleaner;
   conduit means extending downwardly internally of said collection bag in communication with said inlet for discharging the received dust laden air flow to a location within the body of liquid in said compartment portion; and
   outlet means defined in said collection bag at a location removed from the contained body of liquid through which air flow emerging from the body of liquid can be discharged relatively dust free to atmosphere.

2. A disposable dust collection bag in accordance with claim 1 including baffle means positioned in said compartment intervening in the flow path between said compartment portion and said outlet means and defining a relatively tortuous flow path by which entrained liquid in the emerging air flow is separated from the air flow for retention within said compartment.

3. A disposable dust collection bag in accordance with claim 2 in which said baffle means comprises a plurality of spaced apart baffle units extending in an interferring relation to the air flow emerging from said compartment portion.

4. A disposable dust collection bag according to claim 2 in which the body of liquid to be contained in said compartment portion comprises a controlled quantity of water occupying up to about twelve percent of the internal compartment volume of said bag.

5. A disposable dust collection bag in accordance with claim 4 in which said bag is of an upright configuration and said compartment portion is defined as through like in section along the bottom end thereof for containing the body of filtering liquid.

6. A disposable dust collection bag in accordance with claim 2 in which said bag is comprised of sheeting formed of a polymer composition of selected thickness and characterized as being able to withstand air flow pressures of about 15 psig.

7. A disposable dust collection bag in accordance with claim 6 in which said polymer composition is selected from the group consisting of polyethylene vinyl and polyvinylchloride.

8. In a vaccum cleaner apparatus having vacuum generating means and a collection compartment through which vacuum air is passed for collection of dust particles therefrom, a disposable dust collection bag for liner use within said collection compartment and comprising in combination:
   an elongated collection bag of nonporous composition defining an internal compartment having a portion in which to contain a body of liquid comprising a dust collection media;
   inlet means defined in said collection bag at a location above the normal liquid level and adapted to receive dust laden air from the vacuum cleaner;
   conduit means extending downwardly internally of said collection bag in communication with said inlet for discharging the received dust laden air flow to a location within the body of liquid in said compartment portion; and
   outlet means defined in said collection bag at a location removed from the contained body of liquid through which air flow emerging from the body of liquid can be discharged relatively dust free to atmosphere.

* * * * *